United States Patent [19]
Martin et al.

[11] Patent Number: 6,126,913
[45] Date of Patent: *Oct. 3, 2000

[54] THERMAL OXIDIZERS WITH IMPROVED PREHEATING MEANS AND PROCESSES FOR OPERATING SAME

[75] Inventors: Richard J. Martin; John D. Stilger, both of San Jose; Mark R. Holst, Concord, all of Calif.

[73] Assignee: Thermatrix, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/659,579

[22] Filed: Jun. 6, 1996

[51] Int. Cl.$^7$ ............................... B01J 8/00; F23B 5/20; F23D 21/00; A62D 3/00
[52] U.S. Cl. .......................... 423/245.3; 431/7; 431/170; 431/238; 588/205
[58] Field of Search ........................ 423/245.3; 385/205; 431/7, 170, 238

[56] References Cited

U.S. PATENT DOCUMENTS

| | | | |
|---|---|---|---|
| 4,688,495 | 8/1987 | Galloway | 110/250 |
| 4,823,711 | 4/1989 | Kroneberger et al. | 110/236 |
| 5,147,201 | 9/1992 | Xiong | 431/326 |
| 5,165,884 | 11/1992 | Martin et al. | 431/7 |
| 5,320,518 | 6/1994 | Stilger et al. | 431/7 |
| 5,366,708 | 11/1994 | Matros et al. | 423/245.3 |
| 5,451,300 | 9/1995 | Matros et al. | 423/245.3 |
| 5,453,259 | 9/1995 | D'Souza | 423/245.3 |
| 5,571,491 | 11/1996 | Thunstrom | 423/245.3 |
| 5,601,790 | 2/1997 | Stilger et al. | 423/245.3 |

OTHER PUBLICATIONS

U.S. Ser. No. 347,870, Holst et al., filed Dec. 1, 1994.
U.S. Ser. No. 393,023, Holst et al., filed Feb. 23, 1995.
Kays, W.M. and London, "Compact Heat Exchangers", 3rd Edition, McGraw–Hill Book Company, New York, 1984, pp. 90–92.

*Primary Examiner*—Gary P. Straub
*Attorney, Agent, or Firm*—Woodcock Washburn Kurtz Mackiewicz & Norris LLP

[57] ABSTRACT

The present invention provides thermal oxidizers containing improved preheating designs and processes for improving the preheating of thermal oxidizers. The processes are practiced by preheating the matrix-bed of matrix materials in a flow path that is opposite in direction to the flow path for the processing fluids through the matrix bed. In such a process, there is a substantial reduction in the time and energy required for the preheating of the matrix bed in comparison to the prior processes using same flow direction preheating.

12 Claims, 3 Drawing Sheets

THERMAL OXIDIZERS WITH IMPROVED PREHEATING MEANS AND PROCESSES FOR OPERATING SAME

FIELD OF THE INVENTION

The present invention relates to the thermal destruction of volatile organic compounds (VOCs) within a heated matrix bed of heat resistant materials contained within a thermal oxidizer. More particularly, the present invention provides improved methods for preheating the matrix bed of such thermal oxidizers.

BACKGROUND OF THE INVENTION

Significant research into the phenomena of oxidation within matrix beds of heat resistant materials that are contained within a thermal oxidizer has recently been undertaken. Because such oxidation can occur outside the normal premixed fuel/air flammability limits, the technology can be called "flameless." In this regard U.S. Pat. Nos. 4,688,495 (Galloway) and 4,823,711 (Kroneberger et al.) disclose early work on matrix oxidation technology. In addition, U.S. Pat. Nos. 5,165,884 (Martin et al.) and 5,320,518 (Stilger et al.), and application Ser. No. 08/393,023 (Holst et al.), filed Feb. 23, 1995 now U.S. Pat. No. 5,533,890,discuss in significant detail the technology involved in the designing of thermal oxidizers. The issued Martin et al., Holst et al., Stilger et al., Galloway, and Kroneberger et al. patents are hereby incorporated in their entireties by reference.

The thermal oxidizers set forth in the Martin et al. patent generally contained a matrix bed of solid, heat resistant material. Such thermal oxidizers functioned to destroy VOCs within a process gas stream by passing those gases through the matrix bed, which was heated to a temperature above the autoignition point of the process gases. The thermal oxidizers set, forth in Martin et al. can be referred to as "straight-through" units in that the flow path of the process gases through the matrix bed is direct, with the gases entering at either the bottom or top and exiting at the opposite end, thus passing straight through the matrix bed.

Previously, the straight-through thermal oxidizers have been preheated generally by directing heated gases through the matrix bed in the same flow path as that taken by the process gases. Such preheating systems and methods for preheating of the matrix bed are discussed in the Martin et al. patent. Typically, the preheating procedure was conducted until the entire matrix bed was heated to a temperature above the autoignition point of the process gases, commonly above about 1400° F.

The preheating procedure was a relatively time-consuming process due to the fact that the matrix materials efficiently absorbed the heat from the preheating gases. In such a way, the temperature of the matrix bed was generally not raised in a uniform fashion, but rather the portion of the matrix bed proximate to the preheating gas inlet was initially heated to high temperatures and thereafter the temperature of the rest of the matrix bed was gradually raised in a "thermal wave-like" fashion.

After the matrix bed was heated, cooling gases, typically air, were directed into the oxidizer to cool the plenum area and the lower portion of the matrix bed to a temperature below the autoignition temperature. This cooling step was conducted to avoid any safety hazards associated with the unwanted oxidation of the process gases prior to their entering into the matrix bed.

A need therefore exists to optimize the preheating process associated with straight-through thermal oxidizers. Efficiencies in operating time and costs could be obtained if processes could be developed to decrease the time to preheat the matrix bed and to avoid altogether the need to cool the preheated bed.

SUMMARY OF THE INVENTION

The present invention describes processes for improving the efficiency of the preheating steps taken to preheat the matrix bed of heat resistant materials that are contained within a thermal oxidizer that is designed for straight-through flow of the process fluids. The thermal oxidizer is designed to destroy volatile organic compounds (VOCS) that are present within the process fluid by oxidizing the VOCs within the heated matrix bed. The present processes are practiced by directing the flow of the preheating fluids in an opposite flow path relative to the flow path that is established for the processing fluids. In such a way, the present processes substantially reduce the time and heat energy required to preheat the matrix bed and eliminate the need for cooling the section of the thermal oxidizer that is proximate to the inlet for the process fluids.

In one embodiment of the present invention, the process for the destruction of the VOCs contained within the process fluid is practiced within a thermal oxidizer that has a process fluid inlet and a process fluid outlet along with a heating fluid inlet and a heating fluid outlet. The thermal oxidizer also contains a matrix bed of solid, heat resistant material, located between the process fluid inlet and outlet and also located between the heating fluid inlet and outlet. The start-up of the thermal oxidizer is accomplished by preheating the matrix bed, prior to a sustained introduction of the process fluid into the thermal oxidizer, by directing a heating fluid through the heating fluid inlet, then through the matrix bed, and subsequently removing the heating fluid through the heating fluid outlet. The preheating step is continued for a period of time sufficient to raise the temperature of at least a portion of the matrix bed to a temperature above the autoignition point of the VOCs within the process fluid. Subsequently, the process fluid is introduced into the thermal oxidizer on a sustained basis by directing the process fluid into the thermal oxidizer via the process fluid inlet. The process fluids travels through the heated matrix bed, whereby the VOCs within the process fluid are oxidized within the matrix bed to form a gaseous product, which is comprised primarily of $CO_2$ and $H_2O$. This gaseous product is then removed from the thermal oxidizer through the process fluid outlet. The flow path of the heating fluid through the matrix bed is in an opposite direction from the flow path of the process fluid through the matrix bed.

The present preheating processes can be employed with thermal oxidizers that are "bottom-up" units, in which the process fluid enters the oxidizer from the bottom, traverses through the matrix bed, and exits at the top of the oxidizer. These processes can also be practiced with "top-down" units, in which the process fluid enters the oxidizer from the top, traverses through the matrix bed, and exits at the bottom of the oxidizer.

The present invention also provides the thermal oxidizers useful in practicing the processes of the present invention.

DETAILED DESCRIPTION OF THE PREFERRED EMBODIMENTS

The present invention sets forth improved thermal oxidizers and processes for preheating thermal oxidizers that contain a matrix bed of heat resistant materials for the destruction of volatile organic compounds, or VOCs. The present invention generally relates to the preheating of the matrix bed in a flow path that is in an opposite direction from the flow path of the process fluid gases that are directed through the matrix bed after it has been preheated.

The present invention is uniquely designed to be adaptable to those types of thermal oxidizers that have a "straight-through" process gas flow path. Illustrative of such designs are those shown in U.S. Pat. No. 5,165,884 to Martin et al., and in U.S. Ser. No. 08/347,870 filed Dec. 1, 1994 to Holst et al., now U.S. Pat. No. 5,650,128, which are both hereby incorporated by reference in their entirety. The present invention modifies these designs by providing process equipment changes to allow for preheating of the matrix bed with a preheating fluid that passes through the matrix bed in a flow path that is opposite to the flow path established for the process fluid through the matrix bed.

Figure 1:
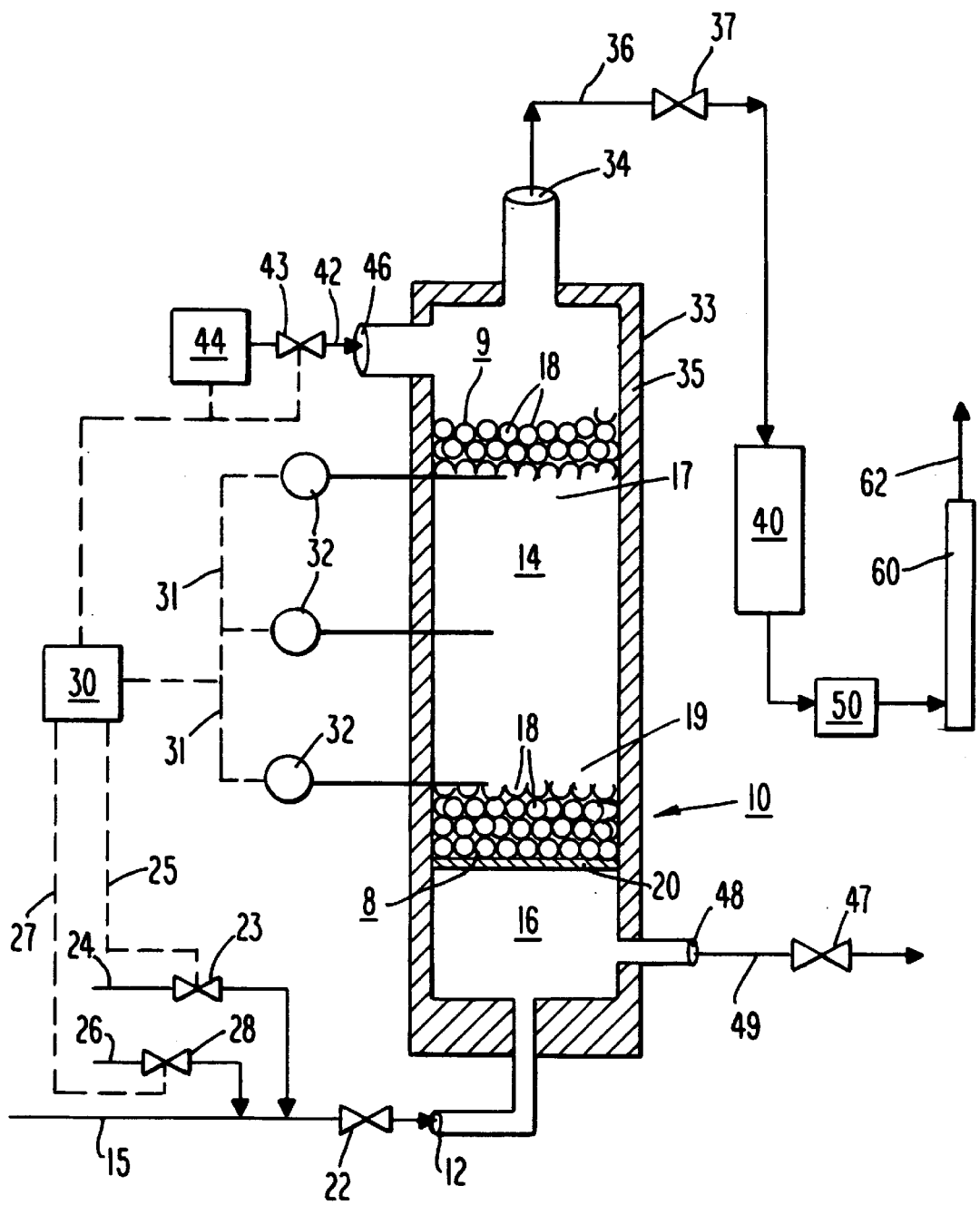
FIG. 1 is a schematic of a processing system utilizing the improved preheating system of the present invention in a "bottom-up" process fluid flow path arrangement.

The features of the present invention can be more readily understood by reference to FIG. 1, which represents one embodiment of the present invention. In this embodiment the thermal oxidizer 10 is shown in an enlarged view in comparison to the other processing units. The thermal oxidizer 10 has a process fluid inlet 12 through which the process fluid, which is typically in its gaseous state, flows into the thermal oxidizer 10. The process fluid that contains the VOCs to be destroyed in the thermal oxidizer 10 is transported to the inlet 12 via line 14.

The process fluid is thereby introduced into a plenum 16, if used, within the thermal oxidizer 10. The process fluid passes through the plenum 16 and then through the matrix bed 14 of heat resistant materials 18. The matrix bed 14 has a leading surface 8, which is the surface of the matrix bed that comes into contact with the process gases initially, and a back surface 9, which is the surface of the matrix bed that is opposite the leading surface 8. A perforated plenum plate 20 can be used to separate the plenum 16 from the matrix bed 14. Upon entering the thermal oxidizer 10, the process fluid will be raised to oxidation temperatures of 1400–3500° F. (760–1925° C.), and preferably 1550–1800° F. (845–980° C.), by the stored heat in the matrix bed 14. The gases that constitute the process fluid are then maintained at these temperatures for a sufficient residence time to ensure substantially complete destruction of the VOCs to stable products, such as $CO_2$ and $H_2O$, within an established oxidation wave within the matrix bed 14. The destruction efficiency of the thermal oxidizer 10 is at least 99%, preferably at least 99.9%, and more preferably at least 99.99%, by weight of the VOCs. The oxidation wave is observed as a steep increase in the temperature of the matrix bed 14 from the temperature of the process fluid on the inlet side of the wave to approximately the adiabatic oxidation temperature of the gaseous mixture on the outlet side of the wave. This rapid change takes place over a relatively short distance in a typical oxidizer, with the actual distance being dependent upon feed concentrations, feed rates, gas velocity distribution, bed material, and bed physical properties, type of specific feed materials, etc. Heat losses in the direction of flow also will have an effect on the length of the oxidation wave. This type of oxidation technology can be referred to as "flameless" because the oxidation of the VOC gasses occurs outside the normal premixed fuel/air flammability limits.

The matrix bed 14 may be sized for any desired process fluid stream by altering the matrix bed 14 flow cross-section, height, material, void fraction, outlet temperature, and supplemental heat addition, if desired. The matrix materials 18 are described as being solid, heat resistant materials in that they can withstand the elevated temperatures of the oxidation process. Preferred matrix materials 18 are ceramic balls, but other bed materials and configurations may be used, including, but not limited to, other random ceramic packings such as saddles or pall rings, structured ceramic packing, ceramic or metal foam, metal or ceramic wool and the like.

Generally, for those operations in which VOCs are primarily hydrocarbon gases ceramic balls are useful as the matrix materials 18 if they have a diameter from about 0.0625 to 3 inches (0.159–7.62 cm), preferably about ¾ inch (1.9 cm). Another useful configuration is the use of random ceramic saddles typically from 0.0625 to 3 inch (0.159–7.62 cm) nominal size, preferably about ½ to 1.5 inches (1.27–3.81 cm) nominal size. Other useful packing materials are pall rings and rashig rings with diameters from about 0.0625 to 3 inches (0.159–7.62 cm), and preferably from about 0.5 to 1.5 inches (1.27–3.81 cm).

A ceramic foam material may also be utilized. A typical foam material that can be utilized has a void fraction of 10 to 99%, preferably 75 to 95%, and most preferably about 90%. The pore sizes in any preferred ceramic foam material will be about 0.1 to 1,000 pores per inch (0.04 to 400 pores per cm), preferably about 1 to 100 pores per inch (0.4 to 40 pores per cm), and most preferably about 10 to 30 pores per inch (4 to 12 pores per cm).

Other shapes of ceramic material may be utilized such as honeycomb shape ceramic. Instead of a ceramic, the heat-resistant matter used to form the bed may also be a metal, which may be randomly packed or may have a structured packing.

Generally, the void fraction of the matrix bed will be between 0.3 and 0.9. In addition, the material in the matrix bed will typically have a specific surface area ranging from 40 $m^2/m^3$ to 1040 $m^2/m^3$.

As a result of the laminar and plug flow characteristics of the oxidation process, and the good distribution of heat resulting from the intra-matrix surface radiation coupled with surface convection, the combustion of the VOCs is more complete than flame combustion. According to the present invention, the VOCs are also heated by heat generated by the oxidation reaction, further increasing the completeness of the reaction.

The plenum 16 will act to evenly distribute the gases entering the oxidizer 10 and further mix these gases prior to entering the matrix bed 14. It is believed that this helps to achieve a relatively flat cross-sectional profile of the oxidation wave perpendicular to the direction of the flow of the gases through the matrix bed 14. In some instances the plenum 16 may be desirable to achieve the flatness of the cross-section of the wave, depending on the configuration of the matrix bed 14. As shown in FIG. 1, the plenum 16 is separated from the matrix bed 14 by the plenum plate 20, which is gas permeable.

The plenum 16 is shown in FIG. 1 as being a void space. However, the plenum 16 can also be filled with matrix material 18 as described in U.S. Ser. No. 08/347,870 now U.S. Pat. No. 5,650,128. For instance, the plenum 16 can contain a different type of matrix material 18 (e.g., ceramic balls) than that used in the matrix bed 14 (e.g., ceramic saddles). In such a construction, the plenum 16 would typically have an interstitial volume in the range of about 40' and the matrix bed 14 would have an interstitial volume in the range of about 70%.

The position and stability of the oxidation wave within the thermal oxidizer 10 can be controlled by means of a process controller 30. Prior to entering the thermal oxidizer 10, supplemental air, carried via line 24, can be injected into the process gases carried along line 14, or supplemental fuel, such as natural gas or propane, can be injected into the process gases via line 26. The rates of addition of the supplemental air and/or fuel can be regulated through use of a process controller 30 that is electronically wired to a control valve 23 on the air line 24 and to a control valve 28 on the fuel line 26, via lines 25 and 27, respectively. The supplemental fuel and/or air are used to maintain an oxidation wave within the thermal oxidizer 10.

The process controller 30 can also control the flow rate of the process gases via valve 22, which can be electronically wired (not shown) to the controller 30. The process controller 30 is also preferably used to monitor the temperature within a plurality of locations within the matrix bed 14. As shown in FIG. 1, the thermocouples 32 are situated to monitor the temperature within the matrix bed 14 and their output is electronically relayed to the process controller 30 via lines 31. In such a way, the temperatures within the matrix bed 14 can be utilized to control the flow of the supplemental air 24 and/or fuel 26 and the process gases through line 15.

The thermal oxidizer 10 has an outer containment shell 33 that is preferably made of carbon steel. This outer containment shell 33 is preferably lined with high temperature insulation 35.

After thorough destruction of the VOCs contained in the process gases within the thermal oxidizer 10, the resulting gaseous products will exit the oxidizer 10 through the process fluid outlet 34 via line 36. The gaseous products will generally be at elevated temperatures, and thus various means can be used to remove thermal energy from this stream for ultimate release of the gases to the atmosphere. As shown in FIG. 1, the gases are directed through a quench unit 40, which sprays a stream of water onto the gaseous products to reduce their temperature. The gaseous products exiting the quench unit 40 optionally can be treated in a scrubber 50 to remove and neutralize acid product gases such as HCl and $SO_2$. The gases can then be directed to a stack 60 and subsequently released to the atmosphere via line 62.

The thermal oxidizer 10 functions to destroy the VOCs by raising those gases to a temperature at which they readily oxidize within the matrix bed 14 of matrix materials 18. As such, prior to the introduction of the process gases into the thermal oxidizer 10, a portion of the matrix bed 14 is preferably raised to a temperature above the auto-ignition point of the incoming process fluid. In accordance with the present invention, this preheating procedure has been improved to reduce preheating time and to reduce the amount of energy required to accomplish the preheating. Accordingly, the improved processes increase the efficiency of the preheating step.

As set forth in the previous references relating to "straight-through" thermal oxidizers, such as in U.S. Pat. No. 5,165,884 and in Ser. No. 08/347,870, now U.S. Pat. No. 5,650,128, the preheating fluids, typically gases, have been directed through the matrix bed of heat resistant material in the same direction as the flow of the process fluids. After the entire matrix bed was preheated, the portion of the matrix bed proximate to the process fluid inlet was then cooled so that the incoming process fluid would not oxidize immediately upon entering the thermal oxidizer. This preheating process thus required that the entire matrix bed be heated first, followed by a cooling of the initial portion of the matrix bed.

The preheating methods of the present invention provide distinct advantages over those prior preheating procedures. The preheating procedures of the present invention can be more fully understood by reference to FIG. 1 which illustrates a thermal oxidizer designed for a "bottom-up" process fluid flow path. The matrix bed 14 within the thermal oxidizer 10 can be preheated by directing a preheating fluid from the preheater 44 through line 42 and through a preheater inlet 46, which is located vertically above the matrix bed in this embodiment. The preheating fluid thus enters the thermal oxidizer 10, is directed downward through the matrix bed 14, and exits through the preheater fluid outlet 48 within line 49.

The preheater 44 can be any device that will create a heated fluid that can be used to raise the temperature of the matrix bed 14. Typically, the preheater 44 will be a gas burner, fired by natural gas, which can typically produce a preheating gas having a temperature above 1400° F., and more commonly between about 1600° F. and 2200° F.

The preheating step can be accomplished, as shown in FIG. 1, by initially closing valve 22 on the inlet line for the process fluid stream and closing valve 37 on the outlet line 36 for the gases exiting the thermal oxidizer, so that the preheating fluid flows through the matrix bed 14. Valve 43 on the preheating fluid inlet line 42 and valve 47 on the preheating fluid exit line 49 will be opened during the preheating step. The preheating will continue for a period of time sufficient to preheat a portion of the matrix bed 14 such that upon introduction of the process fluid into the bed the VOCs within those gases will be oxidized. Thus, the entirety of the matrix bed 14 does not have to be, and is preferably not, preheated to the temperature at which oxidation of the VOCs will take place. In preferred embodiments, the matrix bed will be preheated such that the portion of the matrix bed 14 that is opposite, or distant, from the point of the introduction of the process fluids will be at a temperature above the oxidation temperature of the VOCs, while the portion of the matrix bed 14 that is proximate to the point of the introduction of the process fluids will be at a temperature below the oxidation temperature of the VOCs.

Figure 2:
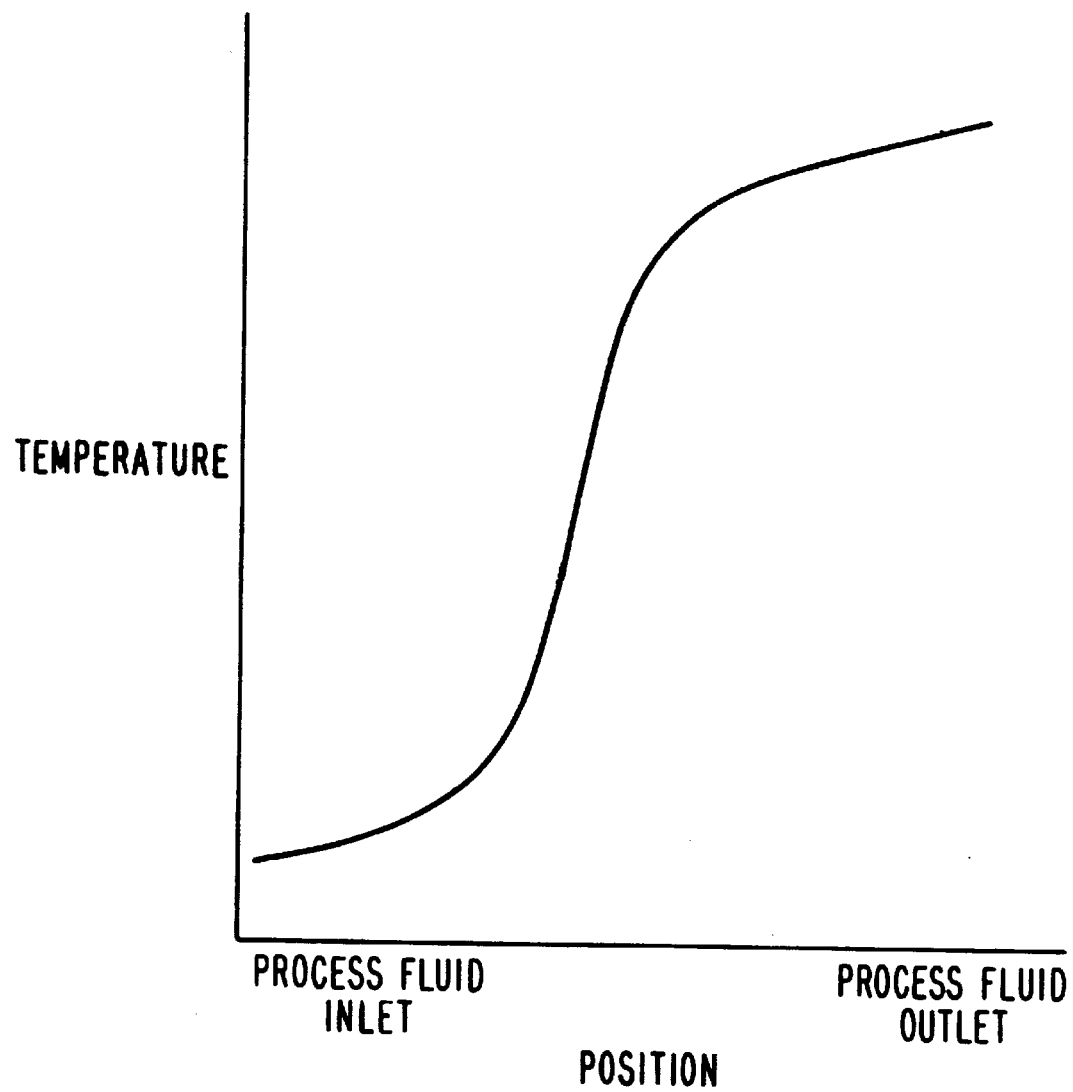
FIG. 2 is a graph of the temperature of the matrix bed along the distance through the matrix bed from the process fluid inlet to the process outlet following the preheating steps of the present invention.

The difference in temperature between the upper portion 17 and the lower portion 19 of the matrix bed 14 (see FIG. 1) after the preheating step has been conducted is primarily due to the convective heat absorption characteristics of the matrix materials 18. These materials readily absorb the heat from the heating fluid and thus the matrix bed 14 is heated in an advancing wave fashion rather than as a collective mass of material. A general preheating profile is represented in FIG. 2 where the temperature of the matrix bed 14 is plotted versus the position from the process fluid inlet 12 to the process fluid outlet 34 for the oxidizer shown in FIG. 1. As can be seen, the upper portion 17 of the matrix bed 14 can be preheated preferentially with respect to the lower portion 19. After establishing such a preheated bed profile, the process fluid can be safely introduced into the matrix bed 14 without any hazard of unwanted oxidation of the process fluids prior to their entering the matrix bed 14 due to a preheated plenum 16.

The preheating generally is continued for a time sufficient to preheat at least about 25% of the matrix bed 14, preferably from about 25% to about 75% of the matrix bed, more preferably from about 25% to about 65% of the matrix bed, and even more preferably from about 30% to about 60% of the matrix bed. These percentages are on a linear distance of the bed basis, measured from the back surface 9 of the matrix bed 14.

The preheating sequence can be controlled by the process controller 30. The thermocouples 32 can be used to monitor the temperature profile of the matrix bed 14. When the upper portion 17 of the matrix bed 14 reaches a sufficiently high temperature, the controller 30 can be used to shut off the preheater 44.

The thermal oxidizer 10 is switched from preheat mode to operation mode by closing valves 43 and 47, and opening valves 22 and 37. The process fluid can then be introduced into the oxidizer 10. These steps can all be regulated by the controller 30. It is noted that the use of valve 37 can be replaced if a water quench unit 40 is employed in the system by flooding the quench unit 40 to establish a water pressure greater than the preheating fluid pressure within the oxidizer.

Figure 3:
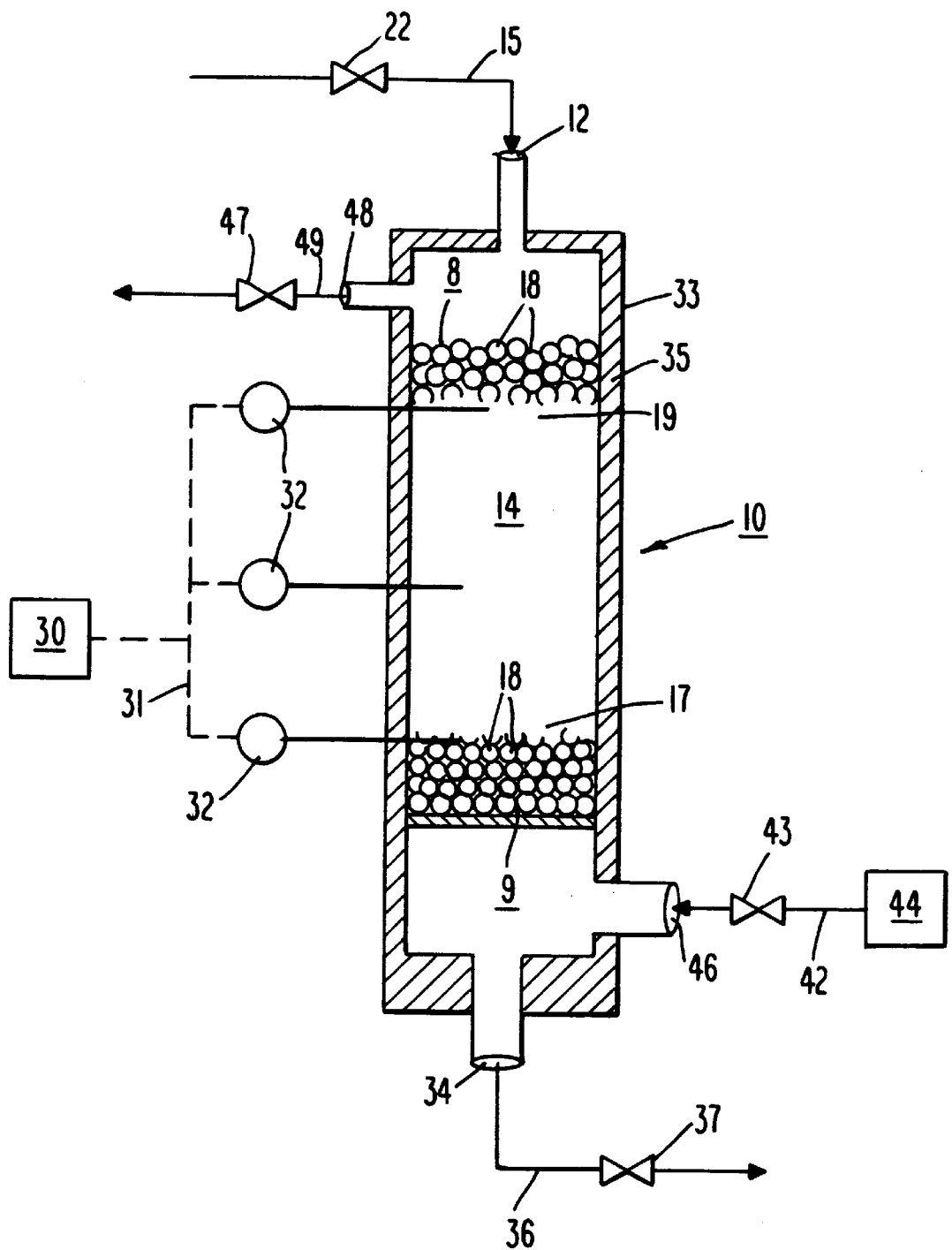
FIG. 3 is a schematic of a processing system utilizing the improved preheating system of the present invention in a "top-down" process fluid flow path arrangement.

The description of the invention has been in general terms, and with respect to FIG. 1, a "bottom-up" process fluid flow path design has been described in detail. The present invention is also applicable to a "top-down" process fluid flow path design, such as the one shown in FIG. 3. In FIG. 3, the process fluid enters the thermal oxidizer 10 from the top through opening 12 and exits via the bottom through outlet 34. The preheating fluid traverses through the matrix bed 14 in an opposite flow path, that is, from the bottom of the oxidizer to the top. The preheating fluid thus enters the oxidizer 10 via inlet 46 and exits the oxidizer via outlet 48. The other material aspects of the oxidizer 10 and its associated process equipment are similar to that described for the embodiment shown in FIG. 1.

What is claimed is:

1. A process for the destruction of oxidizable volatile organic compounds within a process fluid utilizing a preheating procedure, comprising:
   (a) providing a flameless straight through thermal oxidizer having
      (1) a matrix bed of inert solid, heat resistant material located within the thermal oxidizer and having a leading surface and a back surface that is opposite the leading surface;
      (2) a process fluid inlet and a process fluid outlet, the process fluid inlet located vertically below the matrix bed and the process fluid outlet located vertically above the matrix bed;
      (3) a heating fluid inlet and a heating fluid outlet, the heating fluid inlet located vertically above the matrix bed and the heating fluid outlet located vertically below the matrix bed;
      (4) a void space located vertically above the matrix bed;
   (b) preheating from about 25% to about 75% of the matrix bed, as measured from the back surface of the matrix bed, to at least a temperature of 1400° F. while maintaining the remaining portion of the matrix bed below the oxidation temperature of the volatile organic compounds in the process fluid by supplying a preheating as from a preheater to the void space of the flameless thermal oxidizer of the preheating gas having a temperature of at least 1400° F., directing the preheating gas through the matrix bed, and removing the preheating gas through the heating fluid outlet;
   (c) after preheating the matrix bed and in the absence of flow of the preheating gas, introducing the process fluid as a gas into the thermal oxidizer by directing the process fluid through the process fluid inlet and through the heated matrix bed in a single direction opposite to the flow of the preheating gas, a providing a gaseous oxidant to the matrix bed, and oxidizing the oxidizable volatile organic compounds in the process fluid in an exothermic reaction within the matrix bed to form a gaseous product; and
   (d) removing the gaseous product from the thermal oxidizer through the process fluid outlet.

2. The method of claim 1 wherein the flameless thermal oxidizer further comprises a plenum located vertically below the matrix bed for evenly distributing the incoming process fluid.

3. The method of claim 1 wherein the preheater is a burner that fires into the void space of the flameless thermal oxidizer.

4. A process for the destruction of oxidizable volatile organic compounds within a process fluid utilizing a preheating procedure, comprising:
   (a) providing a flameless straight through thermal oxidizer having
      (1) a matrix bed of inert solid, heat resistant material, located within the thermal oxidizer and having a leading surface and a back surface that is opposite to the leading surface;
      (2) a process fluid inlet and a process fluid outlet, the process fluid inlet located vertically below the matrix bed and the process fluid outlet located vertically above the matrix bed;
      (3) a heating fluid inlet and a heating fluid outlet, the heating fluid inlet located vertically above the matrix bed and the heating fluid outlet located vertically below the matrix bed;
      (4) a void space located vertically above the matrix bed;
   (b) preheating from about 25% to about 75% of the matrix bed, as measured from the back surface of the matrix bed to at least a temperature of 1400° F. while maintaining the remaining portion of the matrix bed below the oxidation temperature of the volatile organic compounds in the process fluid by providing a preheater located in the void space of the flameless oxidizer, directing a preheating gas through the heating fluid inlet, through the void space, and heating the preheating gas in the void space with the preheater to form a heated preheating gas, and passing the heated preheating gas through the matrix bed, and removing the heated preheating gas through the heating fluid outlet;
   (c) after preheating the matrix bed and in the absence of flow of the preheating gas, introducing the process fluid as a gas into the thermal oxidizer by directing the process fluid tough the process fluid inlet and through the heated matrix bed in a single direction opposite to the flow of the preheating gas, providing a gaseous oxidant to the matrix bed, and oxidizing the oxidizable volatile organic compounds in the process fluid in an exothermic reaction within the matrix bed to form a gaseous product; and (d) removing the gaseous product from the thermal oxidizer through the process fluid outlet.

5. The method of claim 4 wherein the flameless thermal oxidizer further comprises a plenum located vertically below the matrix bed for evenly distributing the incoming process fluid.

6. A flameless straight through thermal oxidizer, for destroying oxidizable volatile organic compounds within a process fluid, comprising:

(a) a matrix bed of inert solid, heat resistant material, for oxidizing the oxidizable volatile organic compounds, having a leading surface and a back surface that is opposite the leading surface, and a void space located vertically above the back surface of the matrix bed;

(b) a process fluid inlet located vertically below the leading surface of the matrix bed;

(c) a process fluid outlet located vertically above the back surface of the matrix bed;

(d) a preheating fluid inlet located vertically above the back surface of the matrix bed;

(e) a preheating fluid outlet located vertically below the leading surface of the matrix bed;

(f) means for preheating from about 25% to about 75% of the matrix bed as measured from the back surface of the matrix bed to a temperature of at least 1400° F. comprising a preheater mounted to the heating fluid inlet that supplies a preheating gas at a temperature of at least 1400° F. to the void space of the flameless thermal oxidizer and means for directing the preheating gas through the matrix bed, and trough the heating fluid outlet; and (g) means for directing the process fluid as a gas into the process fluid inlet, through the matrix bed in a single direction opposite to the flow of the preheating gas, and out the process fluid outlet wherein the oxidizable volatile organic compounds are oxidized in the matrix bed.

7. The flameless thermal oxidizer of claim 6 further comprising a plenum located vertically below the matrix bed for evenly distributing the incoming process fluid.

8. The flameless thermal oxidizer of claim 7 wherein the plenum comprises a plenum plate located adjacent to the leading surface of the matrix bed and a second void space located vertically below the plenum plate.

9. The flameless thermal oxidizer of claim 6 wherein the preheater is a burner that has means for firing directly into the void space of the flameless thermal oxidizer.

10. A flameless straight through thermal oxidizer, for destroying oxidizable volatile organic compounds within a process fluid, comprising:

(a) a matrix bed of inert solid, heat resistant material, for oxidizing the oxidizable volatile organic compounds, having a leading surface and a back surface that is opposite the leading surface, and a void space located vertically above the back surface of the matrix bed;

(b) a process fluid inlet located vertically below the leading surface of the matrix bed;

(c) a process fluid outlet located vertically above the back surface of the matrix bed;

(d) a preheating fluid inlet, different from the process fluid outlet, located vertically above the back surface of the matrix bed;

(e) a preheating fluid outlet located vertically below the leading surface of the matrix bed;

(f) means for preheating from about 25% to about 75% of the matrix bed as measured from the back surface of the matrix bed to a temperature of at least 1400° F. comprising a preheater located in the void space, means for directing a preheating gas through the heating fluid inlet and the void space to heat the preheating gas with the preheater to form a heated preheating gas, and means for directing the heated preheating gas through the matrix bed and removing the heated preheating gas from the heating fluid outlet; and (g) means for directing the process fluid as a gas into the process fluid inlet, through the matrix bed in a direction opposite to the flow of the preheating gas, and out the process fluid outlet wherein the oxidizable volatile organic compounds are oxidized in the matrix bed.

11. The flameless thermal oxidizer of claim 10 further comprising a plenum located vertically below the matrix bed for evenly distributing the incoming process fluid.

12. The flameless thermal oxidizer of claim 11 wherein the plenum comprises a plenum plate located adjacent to the leading surface of the matrix bed and a second void space located vertically below the plenum plate.

* * * * *